(12) United States Patent
Eastwood et al.

(10) Patent No.: US 10,041,364 B2
(45) Date of Patent: Aug. 7, 2018

(54) INNER DIFFUSER CASE CONE AND SKIRT

(71) Applicant: UNITED TECHNOLOGIES CORPORATION, Farmington, CT (US)

(72) Inventors: Jonathan Jeffery Eastwood, Newington, CT (US); Dave J. Hyland, Portland, CT (US); Timothy Dale, Manchester, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 252 days.

(21) Appl. No.: 14/930,764

(22) Filed: Nov. 3, 2015

(65) Prior Publication Data

US 2016/0160668 A1 Jun. 9, 2016

Related U.S. Application Data

(60) Provisional application No. 62/088,368, filed on Dec. 5, 2014.

(51) Int. Cl.
| | |
|---|---|
| *F01D 1/00* | (2006.01) |
| *F01D 9/04* | (2006.01) |
| *F01D 9/06* | (2006.01) |
| *F01D 25/24* | (2006.01) |
| *F02C 3/13* | (2006.01) |

(Continued)

(52) U.S. Cl.
CPC .............. *F01D 9/04* (2013.01); *F01D 9/065* (2013.01); *F01D 25/162* (2013.01); *F01D 25/24* (2013.01); *F01D 25/243* (2013.01); *F02C 3/13* (2013.01); *F02C 3/14* (2013.01); *F02C 6/08* (2013.01); *F02C 9/18* (2013.01); *F05D 2220/32* (2013.01);

(Continued)

(58) Field of Classification Search
CPC .......... F01D 9/04; F01D 9/065; F01D 25/162; F01D 25/24; F01D 25/243; F05D 2230/60; F05D 2240/128; F05D 2240/35; F05D 2240/14; F02C 7/20; F02C 6/08
See application file for complete search history.

(56) References Cited

U.S. PATENT DOCUMENTS

| | | | |
|---|---|---|---|
| 4,009,569 A | 3/1977 | Kozlin | |
| 5,165,850 A * | 11/1992 | Humke | F01D 25/24 415/135 |

(Continued)

FOREIGN PATENT DOCUMENTS

| | | |
|---|---|---|
| WO | 2014052737 A1 | 4/2014 |
| WO | 2014134513 A1 | 9/2014 |

OTHER PUBLICATIONS

European Search Report for Application No. 15198095.0-1607; dated Apr. 14, 2016; 8 pgs.

*Primary Examiner* — Pascal M Bui Pho
*Assistant Examiner* — Edwin Kang
(74) *Attorney, Agent, or Firm* — Cantor Colburn LLP

(57) ABSTRACT

An inner diffuser case for a gas turbine engine may include a pre-diffuser including a plurality of struts. At least one of the struts may include an aperture therethrough. A cone may have a downstream end coupled to the pre-diffuser downstream of, and proximate to, the aperture. A skirt may have a forward end coupled to the pre-diffuser downstream of, and proximate to, the aperture. The forward end of the skirt may be axially aligned with the downstream end of the cone.

21 Claims, 3 Drawing Sheets

(51) Int. Cl.
*F02C 6/08* (2006.01)
*F01D 25/16* (2006.01)
*F02C 3/14* (2006.01)
*F02C 9/18* (2006.01)

(52) U.S. Cl.
CPC .... *F05D 2230/60* (2013.01); *F05D 2240/128* (2013.01); *F05D 2240/35* (2013.01)

(56) References Cited

U.S. PATENT DOCUMENTS

| | | | |
|---|---|---|---|
| 5,297,386 A * | 3/1994 | Kervistin | F01D 11/24 415/115 |
| 5,778,658 A * | 7/1998 | Lamando, Jr. | F02K 1/822 60/204 |
| 2013/0219917 A1* | 8/2013 | Suciu | F01D 5/081 60/782 |
| 2014/0178174 A1 | 6/2014 | Caprario et al. | |

\* cited by examiner

INNER DIFFUSER CASE CONE AND SKIRT

CROSS-REFERENCE TO RELATED APPLICATIONS

This patent application claims priority under the 35 USC § 119(e) to U.S. Provisional Patent Application Ser. No. 62/088,368, filed on Dec. 5, 2014.

TECHNICAL FIELD

The subject matter of the present disclosure relates generally to gas turbine engines and, more particularly, relates to inner diffuser cases for such gas turbine engines.

BACKGROUND

Gas turbine engines generally include a compressor, a combustor, and a turbine arranged in serial flow combination. Air enters the engine and is pressurized in the compressor. The pressurized air is then mixed with fuel in the combustor. Hot combustion gases are generated when the mixture of pressurized air and fuel are subsequently burned in the combustor. The hot combustion gases flow downstream to the turbine, which extracts energy from the combustion gases to drive the compressor.

The pressurized air exiting the compressor is discharged at a relatively high velocity. Before flowing downstream to the combustor, the pressurized air typically passes through the pre-diffuser of an inner diffuser case upon exiting the compressor to decrease the velocity of the pressurized air and minimize pressure losses. Additionally, in some conventional engines, the pre-diffuser also directs a secondary airflow through a different flow path to separate it from intersecting with the pressurized air. In particular, the separate flow paths of the secondary air and the pressurized air may be achieved by disposing the inner diffuser cone aft of the thrust balance strut hole located in each of the plurality of struts of the pre-diffuser. The thrust balance strut hole in each strut may direct the secondary airflow flowing from a bearing compartment into a high pressure compressor bleed cavity. In some common inner diffuser cases, for example, the inner diffuser cone may be aligned axially with the inner diffuser skirt and the pre-diffuser outlet. While generally effective at separating the airflows, the different pressures and velocities of the various airflows may cause high stresses on the inner diffuser case due, in part, to the axial location and relative positioning of the inner diffuser case cone to the inner diffuser case skirt and the pre-diffuser outlet. Accordingly, there is a need for an inner diffuser case that incurs less stress when separating the pressurized air from intersecting with the secondary airflow.

SUMMARY

In accordance with an aspect of the disclosure, an inner diffuser case for a gas turbine engine is provided. The inner diffuser case may include a pre-diffuser including a plurality of struts. At least one of the struts may include an aperture therethrough. The inner diffuser case may include a cone having a downstream end coupled to the pre-diffuser downstream of, and proximate to, the aperture. The inner diffuser case may include a skirt having a forward end coupled to the pre-diffuser downstream of, and proximate to, the aperture. The forward end of the skirt may be axially aligned with the downstream end of the cone.

In accordance with another aspect of the disclosure, the pre-diffuser may include an outlet defined by an annular outer wall and an annular inner wall. The outlet may be downstream of the aperture.

In accordance with yet another aspect of the disclosure, the downstream end of the cone may be offset axially upstream of the outlet.

In accordance with still yet another aspect of the disclosure, the forward end of the skirt may be offset axially upstream of the outlet.

In further accordance with another aspect of the disclosure, the plurality of struts may be disposed between the annular outer wall and the annular inner wall.

In further accordance with yet another aspect of the disclosure, each of the struts may include an aperture therethrough.

In further accordance with still yet another aspect of the disclosure, the pre-diffuser may include an outlet defined by an annular outer wall and an annular inner wall. The outlet may be downstream of the aperture of each strut.

In even further accordance with another aspect of the disclosure, the aperture of each strut may penetrate through both the annular outer wall and the annular inner wall.

In even further accordance with yet another aspect of the disclosure, each of the struts may be evenly spaced circumferentially from each other.

In accordance with another aspect of the disclosure, a gas turbine engine is provided. The gas turbine engine may include a combustor downstream of a compressor. The engine may include an inner diffuser case upstream of the combustor. The inner diffuser case may include a pre-diffuser including a plurality of struts. At least one of the struts may include an aperture therethrough. The inner diffuser case may include a cone having a downstream end coupled to the pre-diffuser downstream of, and proximate to, the aperture. The inner diffuser case may include a skirt having a forward end coupled to the pre-diffuser downstream of, and proximate to, the aperture. The forward end of the skirt may be axially aligned with the downstream end of the cone.

In accordance with still another aspect of the disclosure, the aperture of each strut may be in fluid communication with a bearing compartment and a high pressure compressor bleed cavity.

In accordance with still yet another aspect of the disclosure, the cone may include an annular flange coupled to an outer diffuser case.

In accordance with still another aspect of the disclosure, a method of reducing stress on an inner diffuser case of a gas turbine engine is provided. The method may include the step of providing a pre-diffuser having an outlet and a plurality of struts wherein at least one of the struts may include an aperture therethrough. Another step may include providing a cone having a downstream end. Yet another step may include providing a skirt having a forward end. Still another step may be arranging the downstream end of the cone on the pre-diffuser downstream of, and proximate to, the aperture. A further step may be arranging the forward end of the skirt on the pre-diffuser downstream of, and proximate to, the aperture. An even further step may be arranging the downstream end of the cone in axial alignment with the forward end of the skirt.

In accordance with yet another aspect of the disclosure, the method may include the step of arranging the plurality of struts to be evenly spaced circumferentially from each other.

In accordance with still yet another aspect of the disclosure, the method may include the step of arranging the downstream end of the cone upstream of, and axially offset from, the outlet.

In accordance with still yet another aspect of the disclosure, the method may include the step of arranging the forward end of the skirt upstream of, and axially offset from, the outlet.

In accordance with an even further aspect of the disclosure, each of the struts may include an aperture therethrough and the aperture of each strut may provide fluid communication between a bearing compartment and a high pressure compressor bleed cavity.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Throughout this specification the terms "downstream" and "upstream" are used with reference to the general direction of gas flow through the engine and the terms "axial", "radial" and "circumferential" are generally used with respect to the longitudinal central engine axis.

Figure 1:
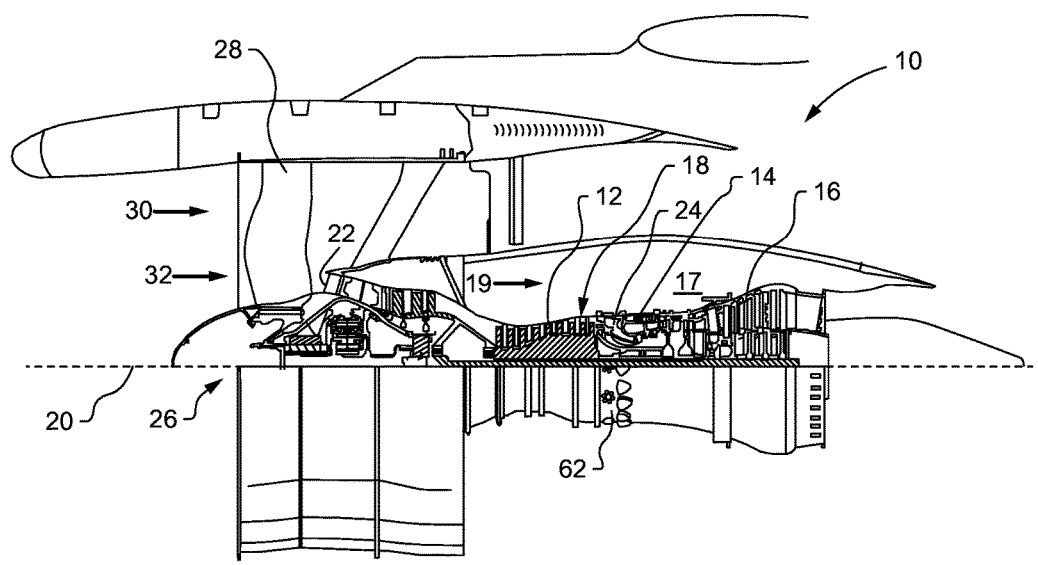
FIG. 1 is a side view of a gas turbine engine with portions sectioned and broken away to show details of the present disclosure.

Referring now to FIG. 1, a gas turbine engine constructed in accordance with the present disclosure is generally referred to by reference numeral 10. The gas turbine engine 10 includes a compressor section 12, a combustor 14 and a turbine section 16. The serial combination of the compressor section 12, the combustor 14 and the turbine section 16 is commonly referred to as a core engine 18. The engine 10 is circumscribed about a longitudinal central axis 20.

Air enters the compressor section 12 at the compressor inlet 22 and is pressurized. The pressurized air then passes through a pre-diffuser 24 before entering the combustor 14. In the combustor 14, the air mixes with jet fuel and is burned, generating hot combustion gases that flow downstream to the turbine section 16. The turbine section 16 extracts energy from the hot combustion gases to drive the compressor section 12 and a fan 26, which includes a plurality of airfoils 28 (one airfoil shown in FIG. 1). As the turbine section 16 drives the fan 26, the airfoils 28 rotate so as to take in more ambient air 30. This process accelerates the ambient air 30 to provide the majority of the useful thrust produced by the engine 10. Generally, in some modern gas turbine engines, the fan 26 has a much greater diameter than the core engine 18. Because of this, the ambient air flow 30 that passes around the core engine 18 through a bypass duct 17 as bypass air flow 19 can be 5-10 times higher, or more, than the core air flow 32 through the core engine 18. The ratio of bypass air flow 19 relative to the core air flow 32 is known as the bypass ratio.

Figure 2:
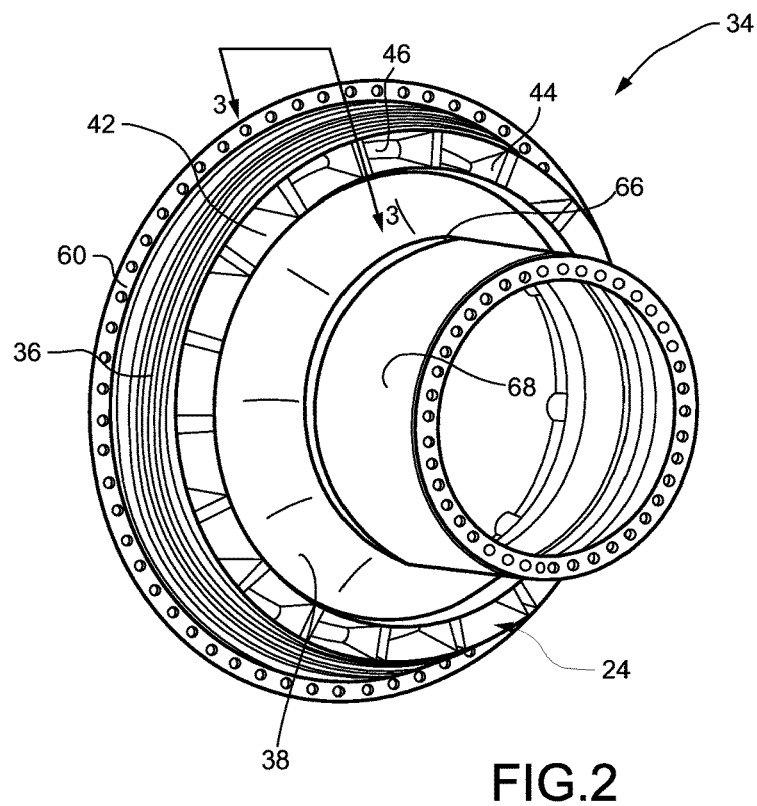
FIG. 2 is a perspective view of an inner diffuser case including a pre-diffuser, constructed in accordance with the teachings of the present disclosure.

As best seen in FIG. 2, an inner diffuser case 34 may be defined by a cone 36, the pre-diffuser 24, and a skirt 38. The inner diffuser case 34 may be arranged downstream of the compressor section 12 and upstream of the combustor 14. Moreover, the inner diffuser case 34 may circumscribe the longitudinal central axis 20.

Figure 3:
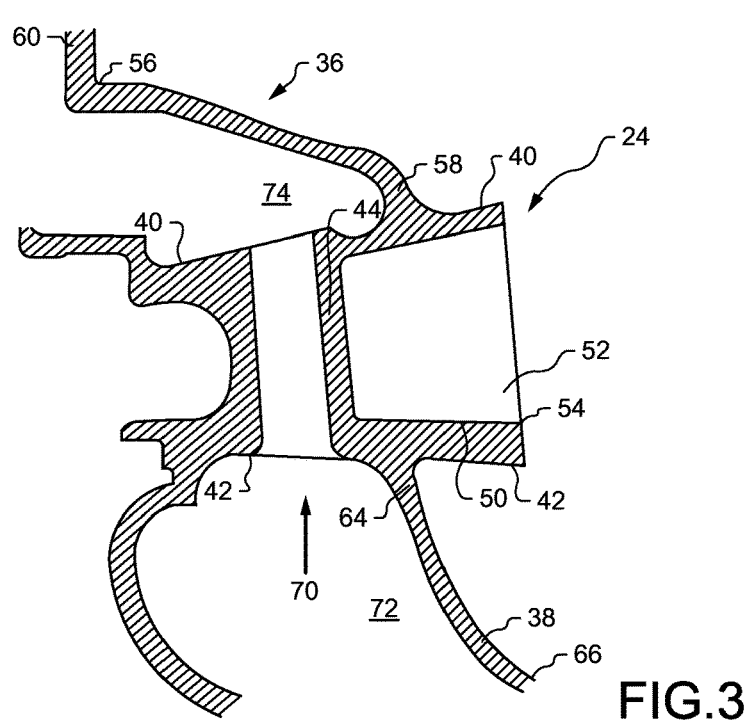
FIG. 3 is a cross-sectional side view of a portion of the inner diffuser case taken along line 3-3 of FIG. 2, constructed in accordance with the teachings of the present disclosure.

With reference to both FIGS. 2 and 3, the pre-diffuser 24 may include an annular outer wall 40 and an annual inner wall 42 that is spaced radially inward of the annular outer wall 40. A plurality of struts 44 may be disposed between the annular outer wall 40 and the annular inner wall 42. Each of the plurality of struts 44 may be evenly spaced circumferentially from each other to define a pre-diffuser flow path 46 between each strut 44 and between the walls 40, 42, collectively. Each strut 44 may include an aperture 48 that extends radially therethrough and penetrates through both the annular outer wall 40 and the annular inner wall 42. Furthermore, each strut 44 may include an aft portion 50 downstream of its aperture 48. The aft portion 50 of each strut 44 may be solid or may include a strut hollow 52, as exemplarily depicted in FIG. 3. The strut hollow 52 may be included to reduce the overall weight of the pre-diffuser 24. The annular outer wall 40 and the annular inner wall 42 may diverge radially from each other in the downstream direction to define a pre-diffuser outlet 54 at their downstream ends facing the combustor 14. The pre-diffuser outlet 54 may be arranged downstream of the apertures 48.

The cone 36 may have a frustroconical shape such that it narrows radially inwardly between its upstream end 56 and its downstream end 58. An annular flange 60 may extend radially outwardly from the upstream end 56 of the cone 36. The annular flange 60 may be coupled to an outer diffuser case 62 (shown in FIG. 1), which circumscribes the inner diffuser case 34. The downstream end 58 of the cone 36 may be coupled to the annular outer wall 40 of the pre-diffuser 24 such that it transitions into the annular outer wall 40 at a location that is downstream of, yet proximate to, the apertures 48 of the struts 44 and upstream of the pre-diffuser outlet 54. In particular, the pre-diffuser outlet 54 terminates further downstream than the downstream end 58 of the cone 36 such that the downstream end 58 of the cone 36 is offset axially upstream of the pre-diffuser outlet 54.

The skirt 38 may include a forward end 64 and an aft end 66 that is downstream of and radially inward of the forward end 64 such that the skirt 38 has a curved shaped. The forward end 64 of the skirt 38 may be coupled to the annular inner wall 42 of the pre-diffuser 24 such that it transitions into the annular inner wall 42 at a location that is downstream of, yet proximate to, the apertures 48 of the struts 44 and upstream of the pre-diffuser outlet 54. In particular, the pre-diffuser outlet 54 terminates further downstream than the forward end 64 of the skirt 38 such that the forward end 64 of the skirt 38 is offset axially upstream of the pre-diffuser outlet 54. As best seen in FIG. 3, the axial location of the forward end 64 of the skirt 38 is aligned axially with the axial location of the downstream end 58 of the cone 36. Furthermore, the aft end 66 of the skirt 38 may be coupled to an annular inner case wall 68 of the inner diffuser case 34.

During engine 10 operation, the core airflow 32 exiting the compressor 12 flows between each of the struts 44 along each pre-diffuser flow path 46 and flows out the pre-diffuser outlet 54 downstream toward the combustor 14. A secondary airflow 70 traveling from a bearing compartment 72, formed partially by the skirt 38 and the annular inner case wall 68, flows through each of the apertures 48 of the struts 44 and into a high pressure compressor bleed cavity 74, formed partially by the annular outer wall 40 and the cone 36. With the forward end 64 of the skirt 38 and the downstream end 58 of the cone 36 being aligned axially and proximate the apertures 48 of the struts 44, as well as, being offset axially upstream from the pre-diffuser outlet 54, stresses on the inner diffuser case 34 are reduced compared to prior art arrangements.

Figure 4:
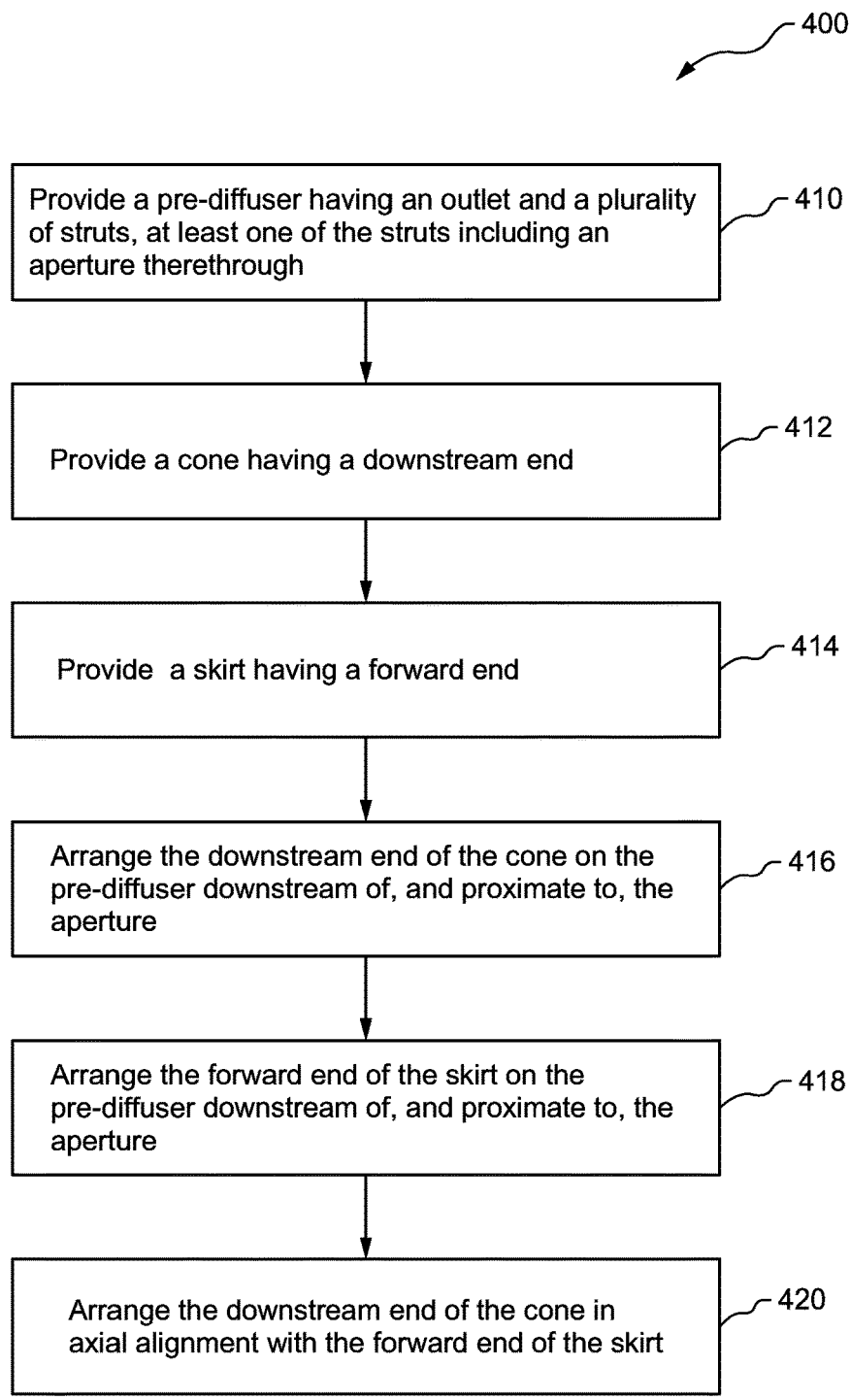
FIG. 4 is a flowchart illustrating a sample sequence of steps which may be practiced in accordance with the teachings of this disclosure.

FIG. 4 illustrates a flow chart 400 of a sample sequence of steps which may be performed to reduce stress on an inner diffuser case of a gas turbine engine. Box 410 shows the step of providing a pre-diffuser having an outlet and a plurality of struts. At least one of the struts may include an aperture therethrough. Another step, as illustrated in box 412, is providing a cone having a downstream end. Box 414 illustrates the step of providing a skirt having a forward end. Yet another step, as depicted in box 416, is arranging the downstream end of the cone on the pre-diffuser downstream of, and proximate to, the aperture. Box 418 depicts the step of arranging the forward end of the skirt on the pre-diffuser downstream of, and proximate to, the aperture. Another step depicted in box 420 is arranging the downstream end of the cone in axial alignment with the forward end of the skirt. Another step may be arranging the plurality of struts to be evenly spaced circumferentially from each other. A further step may be arranging the downstream end of the cone upstream of, and axially offset from, the outlet. Yet another step may be arranging the forward end of the skirt upstream of, and axially offset from, the outlet. Each of the struts may include an aperture therethrough and the aperture of each strut may provide fluid communication between a bearing compartment and a high pressure compressor bleed cavity. The cone may include an annular flange coupled to an outer diffuser case.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

Based on the foregoing, it can be seen that the present disclosure sets forth an inner diffuser case including a cone with a downstream end that is aligned axially with a forward end of a skirt. In addition, the downstream end of the cone and the forward end of the skirt are disposed downstream of the apertures of each strut while being positioned very close to the apertures. The teachings of this disclosure may also be employed such that the downstream end of the cone and the forward end of the skirt are offset axially upstream from the pre-diffuser outlet. Moreover, through the novel teachings set forth above, stresses on the inner diffuser case are reduced compared to prior art cases. Additionally, the inner diffuser case with reduced stresses provides a flow path for secondary airflow from a bearing compartment to a high pressure compressor bleed cavity so that the secondary airflow does not intersect with the core airflow at such a location.

What is claimed is:

1. An inner diffuser case for a gas turbine engine having a longitudinal central engine axis, the inner diffuser case comprising:
    a pre-diffuser including a plurality of struts disposed between an annular inner wall of the pre-diffuser and an annular outer wall of the pre-diffuser, at least one strut of the plurality of struts including at least one respective aperture therethrough;
    a cone having a downstream end coupled to the annular outer wall of the pre-diffuser downstream of the at least one respective aperture, and closer to the at least one respective aperture than an outlet of the pre-diffuser, the cone having an upstream end coupled to a radially outward extending annular flange;
    a skirt having a forward end coupled to the annular inner wall of the pre-diffuser downstream of the at least one respective aperture, and closer to the at least one respective aperture than the outlet of the pre-diffuser, the forward end of the skirt axially aligned with the downstream end of the cone along a radial axis of the longitudinal central engine axis, the skirt having an aft end that is downstream of and radially inward of the forward end;
    wherein a portion of a high pressure compressor bleed cavity is formed by the annular outer wall and the cone, a portion of a bearing compartment is formed by the skirt and the annular inner wall,
    wherein the at least one respective aperture extends between the portion of the bearing compartment and the portion of the high pressure compressor bleed cavity, and
    wherein the at least one respective aperture provides an airflow from the bearing compartment into the high pressure compressor bleed cavity.

2. The inner diffuser case of claim 1, wherein the outlet of the pre-diffuser is defined by the annular outer wall and the annular inner wall, the outlet of the pre-diffuser being downstream of the at least one respective aperture.

3. The inner diffuser case of claim 2, wherein the downstream end of the cone is offset axially upstream of the outlet of the pre-diffuser.

4. The inner diffuser case of claim 3, wherein the forward end of the skirt is offset axially upstream of the outlet of the pre-diffuser.

5. The inner diffuser case of claim 1, wherein each strut of the plurality of struts includes the at least one respective aperture extending therethrough between the portion of the bearing compartment and the portion of the high pressure compressor bleed cavity and wherein the at least one respective aperture of each strut of the plurality of struts provides the airflow from the bearing compartment into the high pressure compressor bleed cavity.

6. The inner diffuser case of claim 5, wherein the outlet of the pre-diffuser is defined by the annular outer wall and the annular inner wall, the outlet of the pre-diffuser being downstream of the at least one respective aperture of each strut of the plurality of struts.

7. The inner diffuser case of claim 6, wherein the at least one respective aperture of each strut of the plurality of struts penetrates through both the annular outer wall and the annular inner wall.

8. The inner diffuser case of claim 1, wherein each strut of the plurality of struts is evenly spaced circumferentially from each other.

9. A gas turbine engine having a longitudinal central engine axis, the gas turbine engine comprising:
   a compressor;
   a combustor downstream of the compressor; and
   an inner diffuser case upstream of the combustor, the inner diffuser case including:
      a pre-diffuser including a plurality of struts disposed between an annular inner wall of the pre-diffuser and an annular outer wall of the pre-diffuser, at least one strut of the plurality of struts including at least one respective aperture therethrough,
      a cone having a downstream end coupled to the annular outer wall of the pre-diffuser downstream of the at least one respective aperture, and closer to the at least one respective aperture than an outlet for the pre-diffuser, the cone having an upstream end coupled to a radially outward extending annular flange,
      a skirt having a forward end coupled to the annular inner wall of the pre-diffuser downstream of the at least one respective aperture, and closer to the at least one respective aperture than the outlet of the pre-diffuser, the forward end of the skirt axially aligned with the downstream end of the cone along a radial axis of the longitudinal central engine axis, the skirt having an aft end that is downstream of and radially inward of the forward end;
      wherein a portion of a high pressure compressor bleed cavity is formed by the annular outer wall and the cone, a portion of a bearing compartment is formed by the skirt and the annular inner wall,
      wherein the at least one respective aperture extends between the portion of the bearing compartment and the portion of the high pressure compressor bleed cavity, and
      wherein the at least one respective aperture provides an airflow from the bearing compartment into the high pressure compressor bleed cavity.

10. The engine of claim 9, wherein the outlet of the pre-diffuser is defined by the annular outer wall and the annular inner wall, the outlet of the pre-diffuser being downstream of the at least one respective aperture.

11. The engine of claim 10, wherein the downstream end of the cone is offset axially upstream of the outlet of the pre-diffuser.

12. The engine of claim 11, wherein the forward end of the skirt is offset axially upstream of the outlet of the pre-diffuser.

13. The engine of claim 9, wherein each strut of the plurality of struts includes the at least one respective aperture extending therethrough between the portion of the bearing compartment and the portion of the high pressure compressor bleed cavity and wherein the at least one respective aperture of each strut of the plurality of struts provides the airflow from the bearing compartment into the high pressure compressor bleed cavity.

14. The engine of claim 13, wherein the outlet of the pre-diffuser is defined by the annular outer wall and the annular inner wall, the outlet of the pre-diffuser being downstream of the at least one respective aperture of each strut of the plurality of struts.

15. The engine of claim 14, wherein the at least one respective aperture of each strut of the plurality of struts penetrates through both the annular outer wall and the annular inner wall.

16. The engine of claim 9, wherein each strut of the plurality of struts is evenly spaced circumferentially from each other.

17. A method of reducing stress on an inner diffuser case of a gas turbine engine, the gas turbine engine having a longitudinal central engine axis, the method comprising:
   providing a pre-diffuser having an outlet and a plurality of struts disposed between an annular inner wall of the pre-diffuser and an annular outer wall of the pre-diffuser, at least one strut of the plurality of struts including at least one respective aperture therethrough;
   providing a cone having a downstream end;
   providing a skirt having a forward end;
   arranging the downstream end of the cone on the annular outer wall of the pre-diffuser downstream of the at least one respective aperture, and closer to the at least one respective aperture than the outlet of the pre-diffuser, the cone having an upstream end coupled to a radially outward extending annular flange;
   arranging the forward end of the skirt on the annular inner wall of the pre-diffuser downstream of the at least one respective aperture, and closer to the at least one respective aperture than the outlet of the pre-diffuser, the skirt having an aft end that is downstream of and radially inward of the forward end;
   arranging the downstream end of the cone in axial alignment along a radial axis of the longitudinal central engine axis with the forward end of the skirt; and
   the plurality of struts being disposed between an annular inner wall of the pre-diffuser and an annular outer wall of the pre-diffuser,
   wherein a portion of a high pressure compressor bleed cavity is formed by the annular outer wall and the cone, a portion of a bearing compartment is formed by the skirt and the annular inner wall, and
   wherein the at least one respective aperture extends between the portion of the bearing compartment and the portion of the high pressure compressor bleed cavity,
   wherein the at least one respective aperture provides an airflow from the bearing compartment into the high pressure compressor bleed cavity.

18. The method of claim 17, further including the step of arranging the plurality of struts to be evenly spaced circumferentially from each other.

19. The method of claim 17, further including the step of arranging the downstream end of the cone upstream of, and axially offset from, the outlet.

20. The method of claim 19, further including the step of arranging the forward end of the skirt upstream of, and axially offset from, the outlet.

21. The method of claim 17, wherein each strut of the plurality of struts includes the at least one respective aperture extending therethrough between the portion of the bearing compartment and the portion of the high pressure compressor bleed cavity, and and wherein the at least one respective aperture of each strut of the plurality of struts provides the airflow from the bearing compartment into the high pressure compressor bleed cavity.

* * * * *